UNITED STATES PATENT OFFICE.

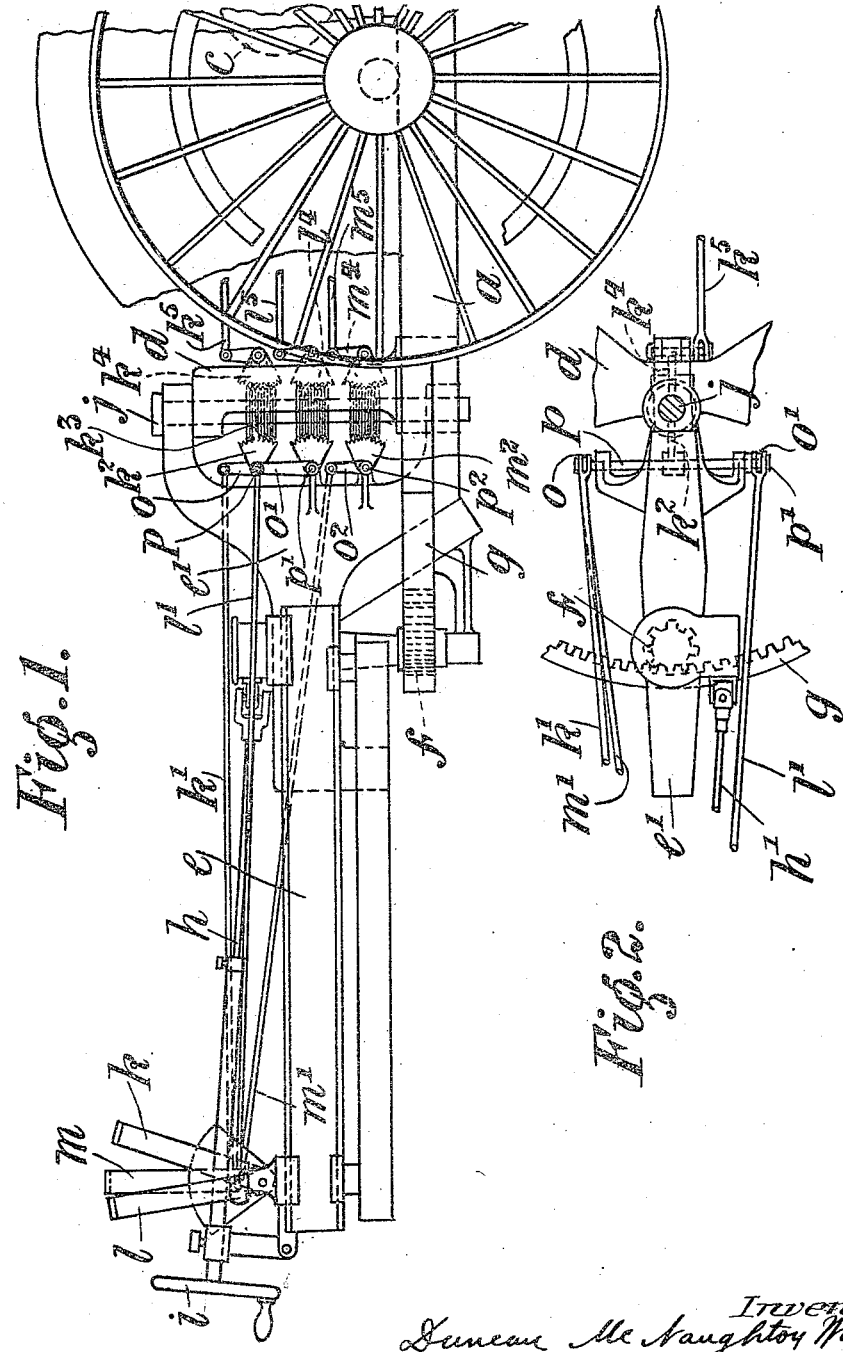

DUNCAN McNAUGHTON WALLACE, OF GLASGOW, SCOTLAND.

MOTOR-CONTROL GEAR OF MOTOR-TRACTORS.

1,282,334.  Specification of Letters Patent.  Patented Oct. 22, 1918.

Application filed September 19, 1917. Serial No. 192,173.

*To all whom it may concern:*

Be it known that I, DUNCAN McNAUGHTON WALLACE, a subject of the King of Great Britain, residing at Glasgow, Scotland, have invented certain new and useful Improvements in the Motor-Control Gears of Motor-Tractors, of which the following is a specification.

This invention relates to motor tractors designed for drawing plows, cultivators, or other agricultural implements of the class characterized by a pivotal or trailing frame to which the agricultural implement can be connected or attached.

The object of the invention is to provide improved means whereby the motor can be readily controlled from the rear of the pivotal frame.

Under this invention the motor controls, which work through the pivot center, have their connecting parts, at the pivot center, made in such manner as to insure a steady and uniform action, no matter what angle, during the steering of the tractor, the pivotal frame may assume relatively to the motor frame. The control rods are caused to impart angular movements to members which act on collars slidably fitted on a vertical pivot pin so as to move the collars up or down said pin, the collars, in their turn, imparting angular movements to other members which actuate the controls.

In order that the invention may be clearly understood I have hereunto appended an explanatory sheet of drawings whereon I have shown the improved motor control gear.

Figure 1 is a general view showing the control gear and also such parts of the motor tractor, in outline, as are necessary to clearly understand the invention.

Fig. 2 is a plan of part of same.

Referring to the drawings:—

Figure 3:
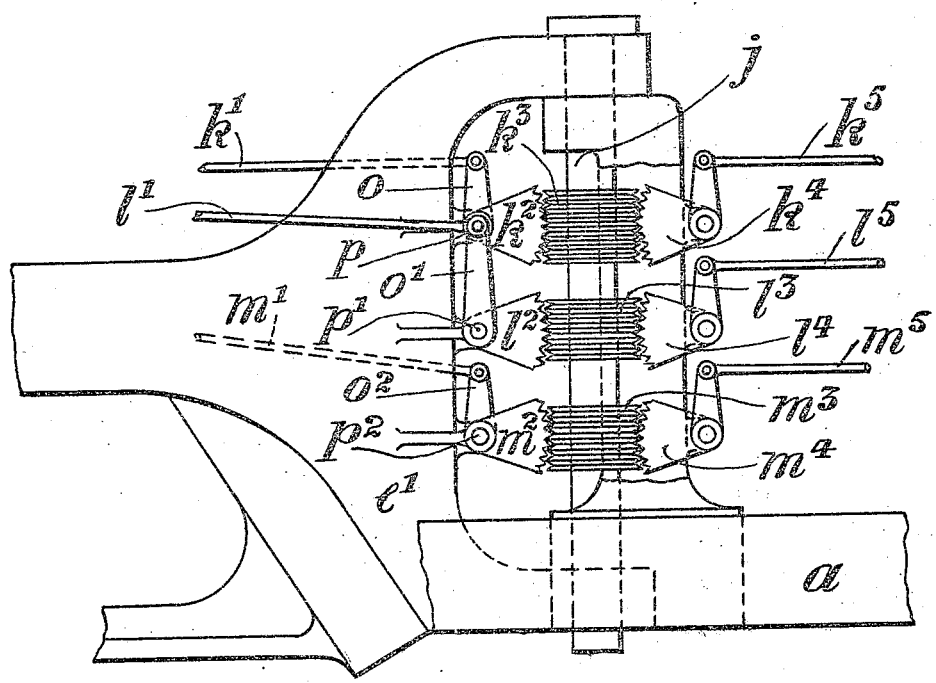
Fig. 3 is an enlarged view of the control gear connections.

$a$ represents the usual motor frame with its tractor wheels and any suitable driving motor $c$. $d$ is an upward extension of the frame $a$ to which the trailing frame $e$, $e^1$, is pivoted. $f$ is the steering pinion which engages with the internally toothed quadrant $g$ of the motor frame. $h$ is the rod for turning the worm gear for rotating the pinion and $i$ is the steering wheel at the rear end of the rod. By turning the wheel $i$ the motor tractor, moving about its pivot, is steered, as desired, through the operation of the pinion and quadrant.

There are three controls shown on the drawing, the one $k$ being for the brake, the one $l$ for the clutch and the one $m$ for reversing the motor.

Under this invention the three control rods $k^1$, $l^1$, and $m^1$ operate, respectively, three arms $o$, $o^1$, $o^2$, on short shafts $p$, $p^1$, $p^2$, upon which are secured toothed segments $k^2$, $l^2$, $m^2$, which, in their turn, engage with collars $k^3$, $l^3$, $m^3$, slidably fitted on the pivot pin $j$. These collars, again, on the opposite side, engage with corresponding toothed segments $k^4$, $l^4$, $m^4$, adapted to actuate through bell crank arms the rods $k^5$, $l^5$, $m^5$, connected respectively with the brake, the clutch, and the motor reversing gear. Each collar is made with a series of parallel circumferential teeth and each pair of segments engage the teeth of its intermediate collar from opposite sides, so that the collar is held in position between the two segments and can be moved steadily and uniformly up and down the pivot pin by the movement of its control rod. If, for instance, the rod $k^1$ is moved, the movement is transmitted to the segment $k^2$ and collar $k^3$ which again transmits the movement to the segment $k^4$ and motor brake control $k^5$.

No matter what angle, during the steering of the tractor by the gear $f$, $g$, the pivotal frame may assume relatively to the motor frame, the segments always remain in gear with the collars and always transmit the control movements through them in a steady and uniform manner. The teeth of the segments would be slightly curved to correspond with the circumference of the collars.

Of course, toothed sectors could be used instead of segments.

Having now fully described my invention what I claim and desire to secure by Letters Patent is:—

1. A control gear, for motor tractors having a pivotal rear frame, comprising a control rod, an angularly movable member operated by the control rod, a slidable member operated by the angularly movable member, and a second angularly movable member operated by the sliding member the second angularly movable member actuating the motor control gear.

2. A control gear, for motor tractors having a pivotal rear frame, comprising two toothed and angularly movable members and a slidable member intermediate said angularly movable members and adapted to transmit movement from the one to the other.

3. A control gear, for motor tractors having a pivotal rear frame, comprising two toothed and angularly movable members and a slidable member with parallel teeth thereon the member being arranged intermediate said angularly movable members and being adapted to transmit movement from the one to the other.

4. A control gear, for motor tractors having a pivotal rear frame, comprising two toothed and angularly movable members and a cylindrical slidable member with parallel teeth thereon the member being arranged intermediate said angularly movable members and being adapted to transmit movement from the one to the other.

5. A control gear, for motor tractors having a pivotal rear frame, comprising a toothed member, a sliding collar with parallel circumferential teeth, a pivot pin on which said collar can slide, and a second toothed member, the teeth of the members engaging the teeth of the collars.

6. A control gear, for motor tractors having a pivotal rear frame, comprising a toothed member, means for imparting angular movement to the same, a sliding collar with parallel circumferential teeth, a pivot pin on which said collar can slide, a second toothed member and means for controlling the motor connected with the second member, the teeth of the members engaging the teeth of the collars.

7. A control gear, for motor tractors having a pivotal rear frame, comprising control rods, angularly movable members operated by the rods, a pivot pin, members slidable upon the pin, and moved by the said members, and other angularly movable members moved by the slidable members to operate the motor control gear.

In testimony whereof I affix my signature in presence of two witnesses.

DUNCAN McNAUGHTON WALLACE.

Witnesses:
HUGH D. FITZPATRICK,
WILLIAM GALL.